United States Patent [19]

Besenbruch et al.

[11] 4,165,662
[45] Aug. 28, 1979

[54] WORK HOLDER ASSEMBLY FOR LATHE USED IN DRESSING CYLINDRICAL AND DISC SHAPED ARTICLES

[75] Inventors: Alex Besenbruch; Franz Krause, both of Isabella, P.R.

[73] Assignee: Besenbruch-Hofmann of Puerto Rico, Inc., Isabella, P.R.

[21] Appl. No.: 863,940

[22] Filed: Dec. 23, 1977

Related U.S. Application Data

[62] Division of Ser. No. 863,943, Dec. 23, 1977.

[51] Int. Cl.² ............................................... B23B 5/02
[52] U.S. Cl. ........................................ 82/4 A; 82/45; 82/40 R
[58] Field of Search .................. 82/4 A, 40, 45 R; 51/DIG. 3, 216 T

[56] References Cited

U.S. PATENT DOCUMENTS

| 2,434,498 | 1/1948 | Klassett | 82/4 A |
| 3,540,165 | 11/1970 | Lanham | 82/4 A |

FOREIGN PATENT DOCUMENTS 1374015  8/1964  France ........................................ 82/4 A

*Primary Examiner*—Leonidas Vlachos
*Attorney, Agent, or Firm*—Edward H. Loveman

[57] ABSTRACT

Means for dressing a work piece in a lathe having a rotary driven shaft includes a work holder assembly adapted to hold a drum or disc in position for dressing a cylindrical face or a circular end face. The work holder assembly includes adapter members having conical faces for engaging a drum therebetween or for engaging in a central hole of a disc. A rigid circular plate has spaced threaded adjustable bolts bearing on the disc or an end wall of the drum. Spacer members bear against the circular plate. Another bolt seats in an end of the rotary driven shaft while the adapter members, plate, and spacer members are disposed in axial alignment on the shaft. The rigid plate and adjustment bolts hold the work piece in axial alignment with the shaft, and correct distortion in the disc or end wall of the drum. They also prevent vibration of the work piece during dressing.

9 Claims, 7 Drawing Figures

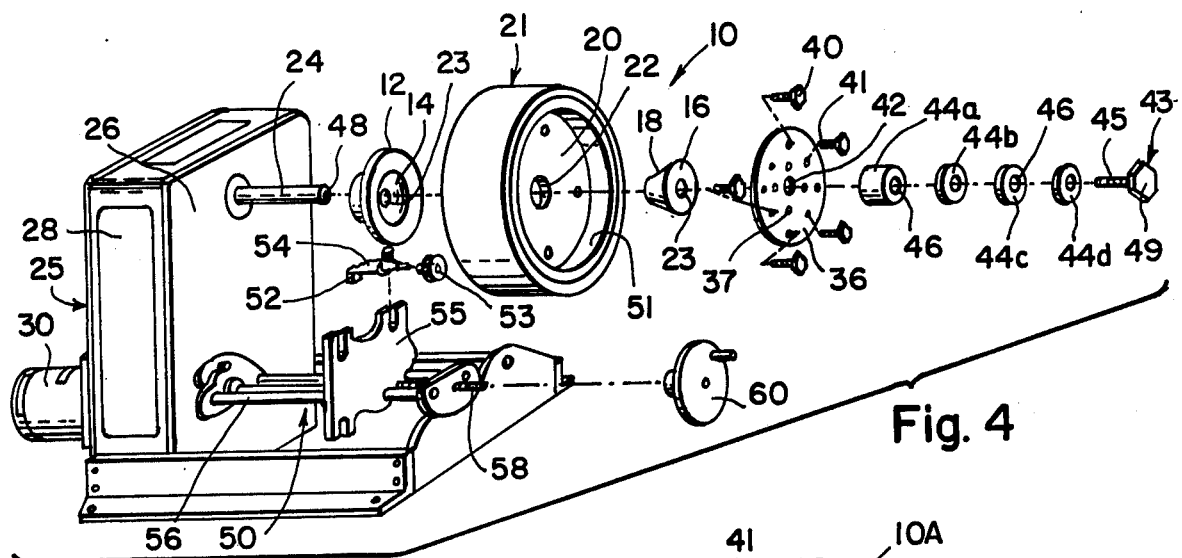

WORK HOLDER ASSEMBLY FOR LATHE USED IN DRESSING CYLINDRICAL AND DISC SHAPED ARTICLES

The invention is particularly directed at use in conjunction with a tool holder assembly such as described in my copending U.S. patent application, Ser. No. 863,943, filed Dec. 23, 1977 entitled: "Tool Holder Assembly For Brake Drum and Disc Lathe" of which this application is a division.

This invention relates to the art of machine tools, and more particularly concerns a work holder assembly for a lathe in which an inside or outside wall of a rotating brake drum or other cylindrical article is dressed, or in which the sides of a disc shaped or other flat article is dressed. In that patent application there is described a tool holder assembly arranged so that in one position of mounting of the tool holder assembly on the housing of the lathe, a cutting or grinding tool is moved axially of a drum or other cylindrical work piece being dressed. In another position of the tool holder assembly, the cutting or grinding tool is moved radially of the disc or other work piece having flat walls to be dressed.

Conventional holders for work pieces in lathes simply hold and rotate the work pieces between head and tail stock members. The present invention is directed at a work holder assembly which has much greater versatility than prior work holders. In the present invention the work holder assembly includes a rigid anti-chatter plate adapted to hold a work piece while rotating on a driven shaft. The plate is adapted to align the end wall of a drum or the body of a disc in a plane perpendicular to the axis of rotation of the shaft. The plate is provided with adjustment screws or bolts which correct any distortions of the wall of the work piece in the plane perpendicular to the driven shaft. Appropriate spacers and adapters are provided to accomodate the work holder assembly to drums and discs of different sizes radially and axially.

It is therefore a principal object of the present invention to provide a work holder assembly for a cylinder or disc dressing lathe with adjustable means for aligning and straightening a work piece radially of a supporting rotary shaft or spindle.

Another object of the present invention is to provide a work holder assembly for a cylinder or disc dressing lathe, including an aligning, anti-chatter plate having adjustable bolts which straighten a work piece radially with respect to a supporting rotary shaft or spindle, and which prevent vibration of the work piece while being dressed. A further object of the present invention is to provide a work holder assembly as described with conical adapters to hold work pieces of different sizes axially and radially on the rotary spindle.

Another object of the present invention is to provide a work holder assembly as described with appropriate spacers which bear on the aligning plate and prevent vibration of the plate and work piece.

These and other objects and many of the attendant advantages of this invention will be readily appreciated as the same becomes better understood by reference to the following detailed description when considered in connection with the accompanying drawings in which:

FIG. 4 is an exploded perspective view of parts of the work holder assembly and the upper part of the lathe and tool holder assembly arranged for dressing a brake drum;

FIG. 5 is an exploded perspective view of parts of the work holder assembly and upper part of the lathe and tool holder assembly arranged for dressing a disc brake;

FIG. 6 is an enlarged diametral sectional view through the drum and work holder assembly taken along line 6—6 of FIG. 2; and FIG. 7 is an enlarged diametral sectional view similar to FIG. 6, taken along line 7—7 of FIG. 3 through the work holder assembly and disc.

Figure 1:
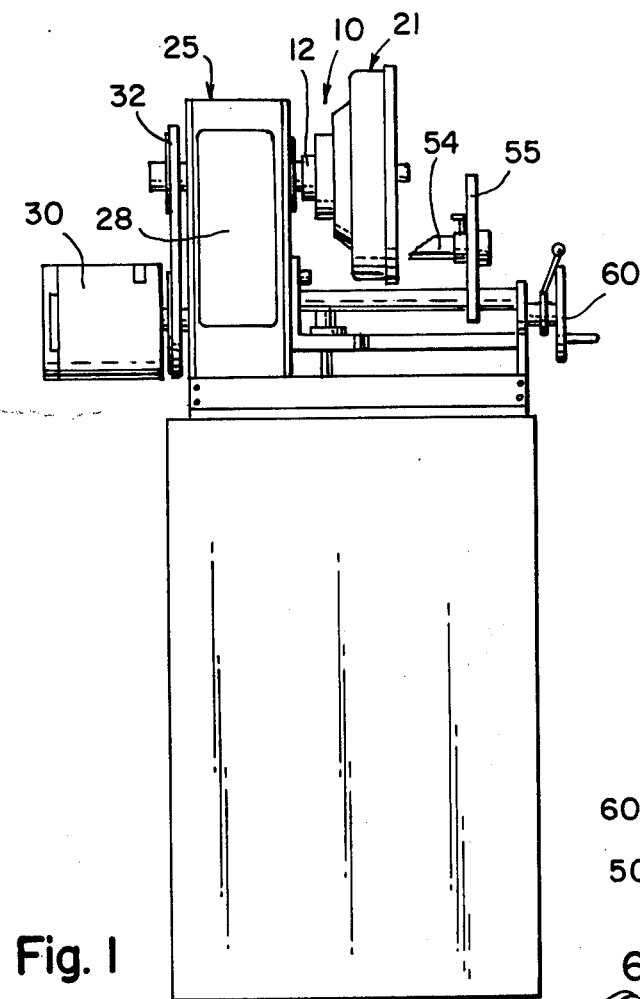
FIG. 1 is a side elevational view of a lathe equipped with a work holder embodying the invention, and shown supporting a brake drum in position for dressing on the lathe.

Referring now to the drawings wherein like reference characters designate like or corresponding parts throughout, there is illustrated in FIGS. 1, 2, 4, and 6, a work holder assembly generally designated as reference numeral 10 comprising a first adapter member 12 having a conical front face 14 and a second adapter member 16 having a conical side 18. A circular end wall 20 of a brake drum 21 is engageable between the face 14 and the side 18 of the adapter members, with the body of adapter member 16 extending through a central hole 22 in the wall 20 of the brake drum 21 into the conical recess in face 14 of the member 12. The adapter members have aligned holes 23 which fit snugly on a rotary shaft or spindle 24 of the lathe 25. The shaft 24 extends forwardly of the front wall 26 of the lathe housing 28. This shaft 24 is rotatably driven by a motor 30 via a belt transmission 32 shown in FIG. 1. The motor 30 is mounted on the back of the lathe housing 28.

At the front of drum wall 20 is a circular, rigid anti-chatter, aligning and straightening plate 36. The plate 36 has threaded holes 37 spaced around the plate 36 to receive a plurality of adjustment bolts 40, which bear adjustably against the circular end wall 20 of the brake drum 21. A nylon plug 41 is inserted in each end 39 of a shank 38 of the bolt 40. The plug 41 extends forwardly of the end 39 to bear against the drum wall 20 when the bolt 40 is threaded into the plate 36. The plate 36 has a central hole 42 through which the shaft 24 extends. Mounted on a bolt 43 forwardly of the plate 36 is a plurality of spacer discs 44a, 44b, 44c, 44d, having different axial lengths. A shank 45 of the bolt 43 extends through holes 46 in the spacer discs 44. The front end of the shaft 24 has a threaded hole 48 which receives the threaded shank 45. A head 49 of the bolt 43 bears against the outermost spacer disc 44d.

The drum 21 is disposed in axial alignment with the shaft 24. The cylindrical inner wall 51 of the drum 21 is axially aligned with the shaft 24. If there is any distortion in the thin end plate 20, this is corrected by adjusting bolts 40 so that they bring the plane of plate 20 into true perpendicularity with respect to the axis of the shaft 24 and at the same time align the central axis of the wall 51 with the axis of the shaft 24. In this way when the drum 21 rotates, the wall 51 is cut and ground by a tool bit 52 which is moved axially inward along the wall 51. If a cylindrical rotor (not shown) is mounted on the shaft 24 in place of the drum 21, the outer cylindrical face of the rotor can be dressed by the tool bit 52.

The tool bit 52 is mounted on a tool holder 54 attached by a bolt 53 to a movable mounting plate 55 of the tool mounting assembly 50. The tool mounting assembly 50 is described in detail in my copending patent application abovementioned, so only the most important features relating to use with the work holding assembly 10 are described here. The plate 55 moves on stationary rods 56 and carries the tool holder 54 toward the front wall 26 of the lathe housing 28. The plate 55 is driven by a threaded lead screw 58 shown best in FIGS. 4 and 5. The lead screw 58 is operatively connected via transmission means in the housing 28 to the motor 30.

The lead screw 58 can be turned manually by means of a handle 60 for adjusting the position of the tool bit axially of the wall 51 to be dressed.

Figure 3:
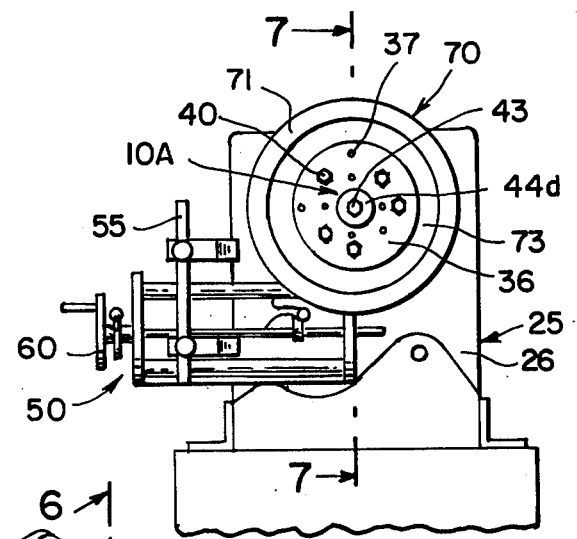
FIG. 3 is a front view of the upper part of the lathe of FIG. 1 showing the work holder assembly supporting a disk in position for dressing on the lathe.

In FIGS. 3, 5, and 7 are shown parts of work holder assembly 10A used with a disc brake 70 which has a rim 71. Each of the faces 72 and 73 of the disc 70 are dressed by a tool 74 carried by the mounting plate 55 shown in FIG. 5. The work holder assembly 10A includes a conical adapter member 75, which can fit into a cylindrical adapter member 76 which has a conical end face 77. A conical adapter member 78 fits in a hole 79 of the disc 70 and the face 72 is abutted to the front edge of the member 76 as shown in FIG. 7. The shaft 24 extends through bores 81, 83, 85 in the members 78, 76, 75 respectively and the alignment plate 36 which is the same as used with the work holder assembly 10. The spacers 44a–44d are disposed in axial alignment on the bolt 43. The plug 41 of the bolts 40 bear adjustably against the face 73 of the disc 70 to prevent it from vibrating when the faces 72, 73 of the disc 70 are being dressed. The bolts 40 can also be adjusted to restore the disc to flatness if it is distorted.

Figure 2:
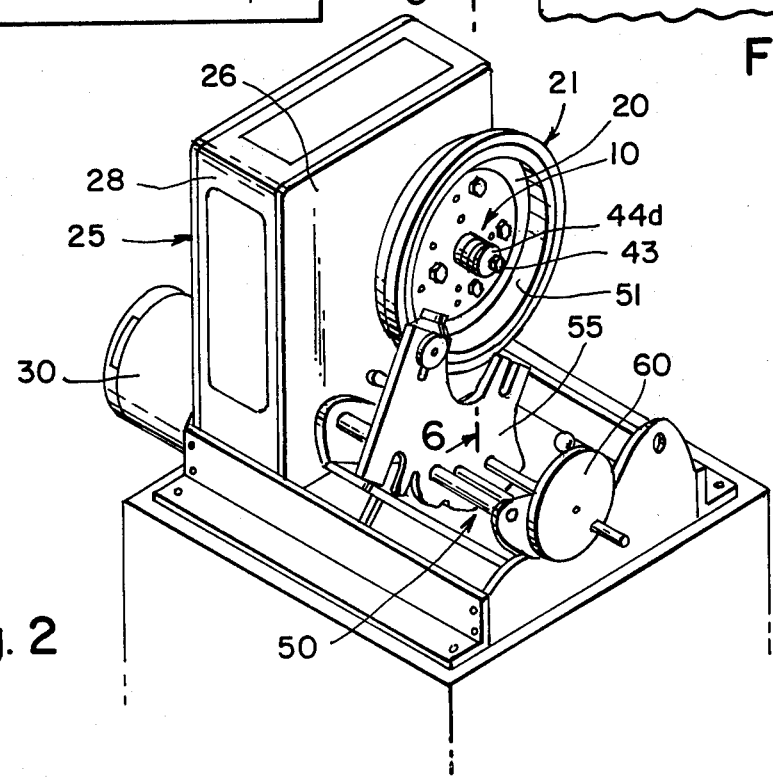
FIG. 2 is an oblique perspective view of the upper part of the lathe of FIG. 1, showing parts of the work holder assembly holding the brake drum.

The tool holding assembly 50 as shown in FIGS. 3 and 5 is disposed in a position 90° to its drum dressing position shown in FIGS. 1, 2, and 4. The tool holding assembly 50 is mounted on the front wall 26 of the lathe housing 28 in such a way that the lead screw 58 is driven by the motor 30 as described in detail in my copending patent application abovementioned. For the purposes of the present invention it is only necessary to point out that the tool 74 moves radially of the disc 70 while the disc rotates, to dress the faces 72 and 73 of the disc 70.

It will be noted that the work holding assemblies 10 and 10A are relatively simple in construction, yet they are remarkably effective in holding the drum 21 and the disc 70 securely, preventing vibration or chatter during grinding cutting or other dressing operation. Securing the drum or disc in position on the shaft 24 requires insertion and tightening of only one screw or bolt 43. The other bolts or screws 40 are easily and quickly adjusted to correct distortion in the drum or disc and to align their axes with the axis of shaft 24.

It should be understood that the foregoing relates to only a limited number of preferred embodiments of the invention which have been by way of example only, and that it is intended to cover all changes and modifications of the examples of the invention herein chosen for the purposes of the disclosure, which do not constitute departures from the spirit and scope of the invention.

The invention claimed is:

1. Means for dressing a work piece having a substantially flat wall in a lathe having a rotary driven shaft, comprising:

a work holder assembly having a first pair adapter members mountable on said shaft with said flat wall disposed between said members;

a flat rigid plate mountable on said shaft; and bearing against one of said members;

a plurality of adjustment members carried by said plate, each of said adjustment members bearing against said flat wall to prevent it from vibrating while said work piece is being dressed, and holding said flat wall in a plane perpendicular to the axis of said shaft;

a plurality of spacer members mountable on said shaft in axial alignment therewith, with one of said spacer members bearing against said plate; and another bolt engageable in an end of said shaft and bearing against another one of said spacer members to hold said spacer members, plate, work piece and adapter members in place on said shaft while said work piece is being dressed.

2. Means for dressing a work piece as defined in claim 1, wherein said work piece is a drum having cylindrical wall to be dressed, and wherein said flat wall is disposed at one end of said drum, and further comprising a tool holder assembly on said lathe, said tool holder assembly comprising:

a tool holder; and means for moving said tool axially of said drum in contact with said cylindrical wall to dress the same while said drum rotates with said shaft.

3. Means for dressing a work piece as defined in claim 1, wherein said work piece is a circular disc, and further comprising a tool holder assembly on said lathe, said tool holder assembly comprising:

a tool holder; and means for moving said tool radially of said disc for dressing said flat wall while said work piece rotates with said shaft.

4. Means for dressing a work piece as defined in claim 1, wherein said plate has a plurality of threaded holes, and wherein said adjustment members are bolts engageable in said holes to bear against said flat wall.

5. Means for dressing a work piece as defined in claim 4, wherein said flat wall has a central hole larger in diameter than that of said shaft, and wherein one of said adapter members is conical in shape to extend through said central hole while another one of said adapter members bears against a side of said flat wall, so that said work piece is held in position on said shaft and whereby adjustment of said bolts in said plate corrects any distortion in said flat wall to hold said plate in a plane perpendicular to the axis of said shaft.

6. Means for dressing a work piece as defined in claim 5, wherein said work piece is a drum having cylindrical wall to be dressed, and wherein said flat wall is disposed at one end of said drum, and further comprising a tool holder assembly on said lathe, said tool holder assembly comprising:

a tool holder; and means for moving said tool axially of said drum in contact with said cylindrical wall to dress the same while said drum rotates with said shaft.

7. Means for dressing a work piece as defined in claim 6, wherein said bolts have a nylon plug extending from the shank end thereof to bear against said flat wall.

8. Means for dressing a work piece as defined in claim 5, further comprising a tool holder assembly on said lathe, said tool holder assembly comprising:

a tool holder; and means for moving said tool radially of said disc for dressing said flat wall while said work piece rotates with said shaft.

9. Means for dressing a work piece as defined in claim 8, wherein said bolts have a nylon plug extending from the shank end thereof to bear against said flat wall.

* * * * *